Patented Jan. 7, 1930

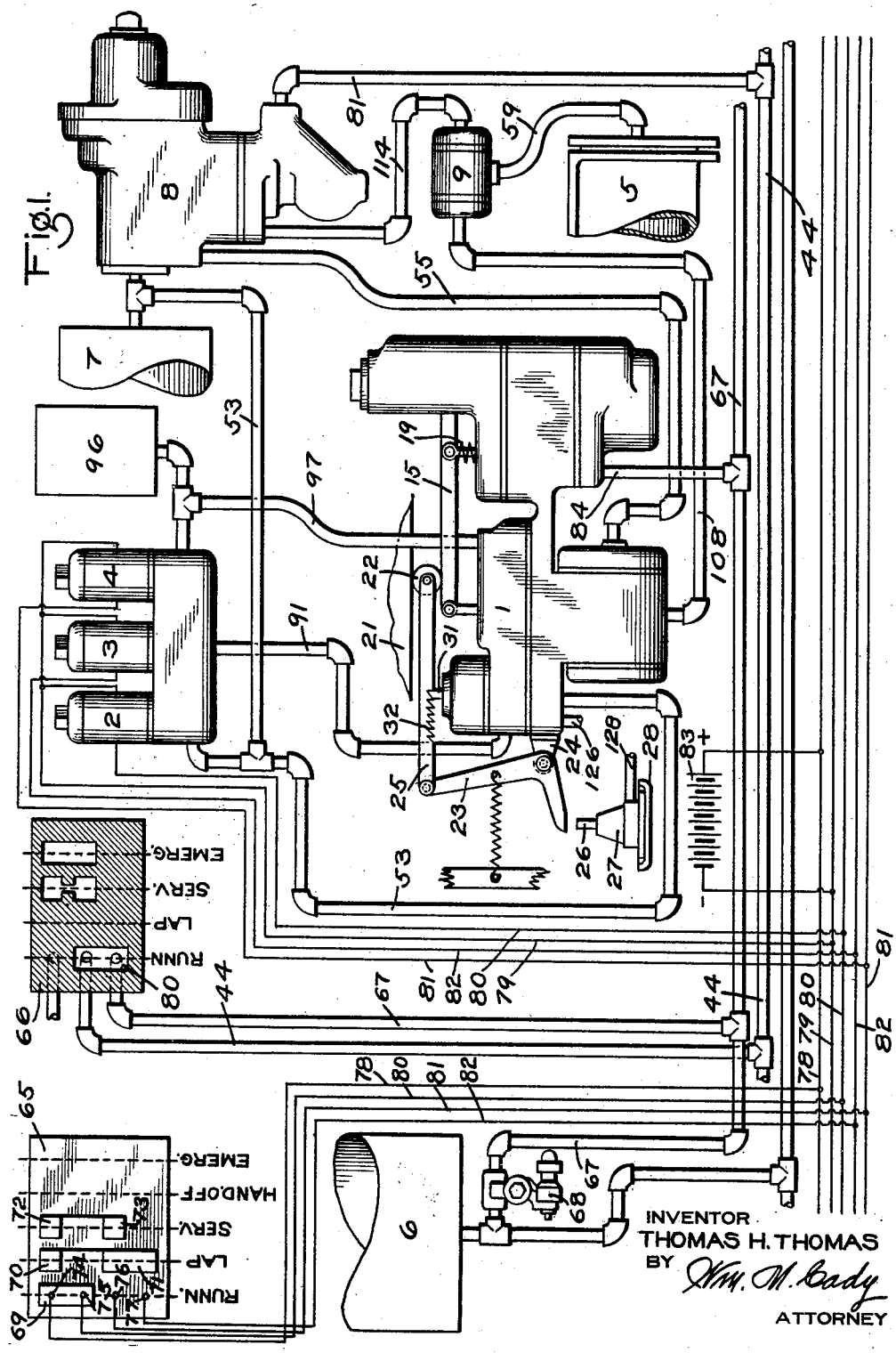

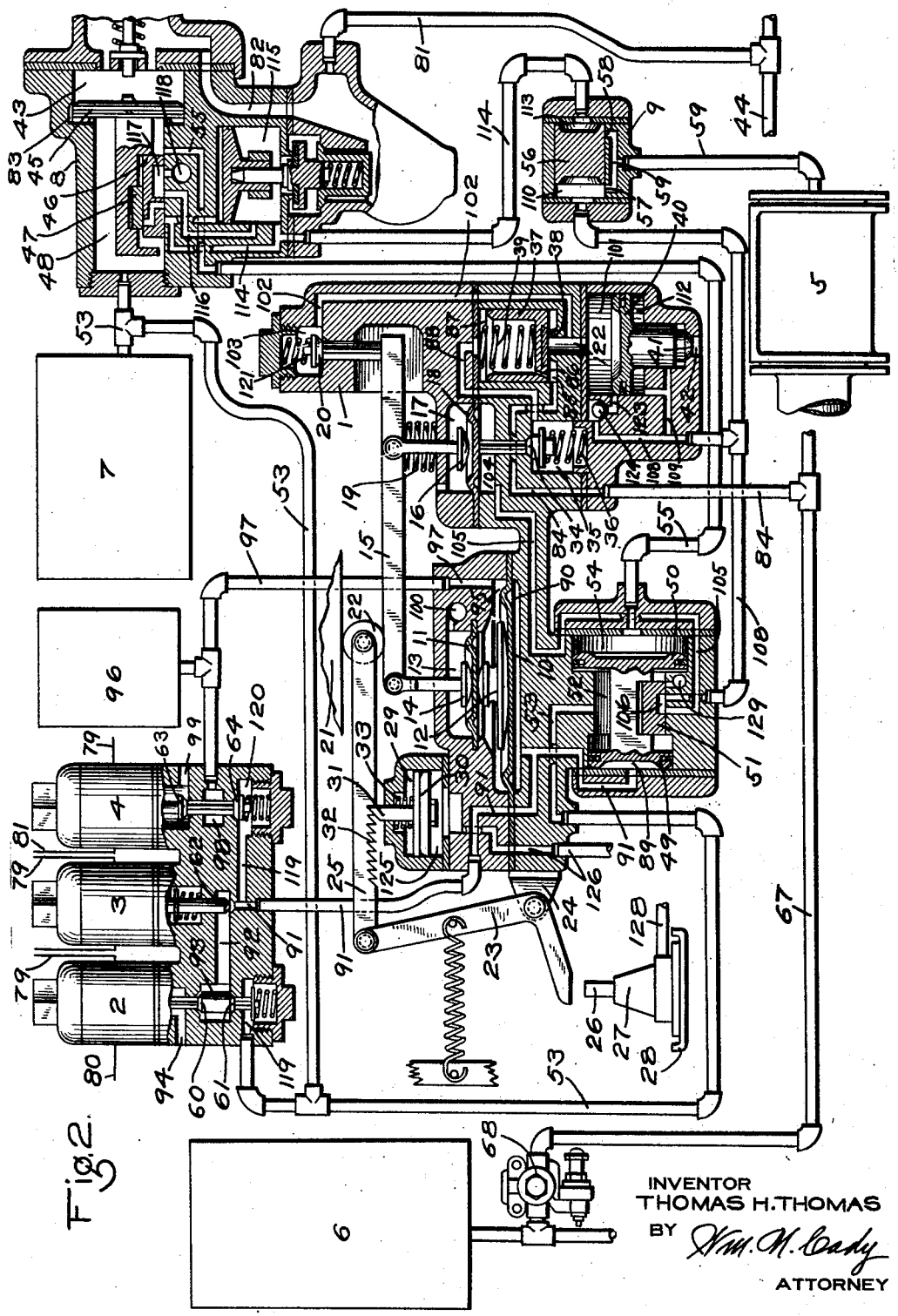

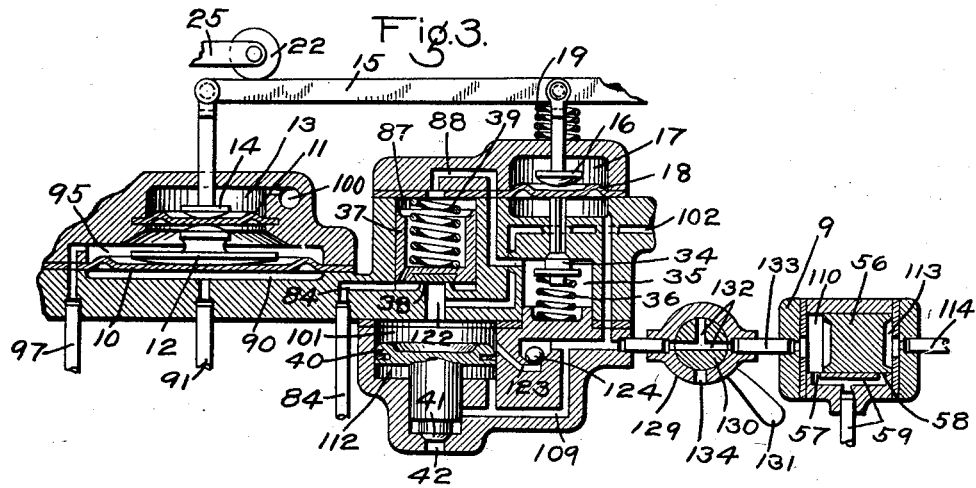
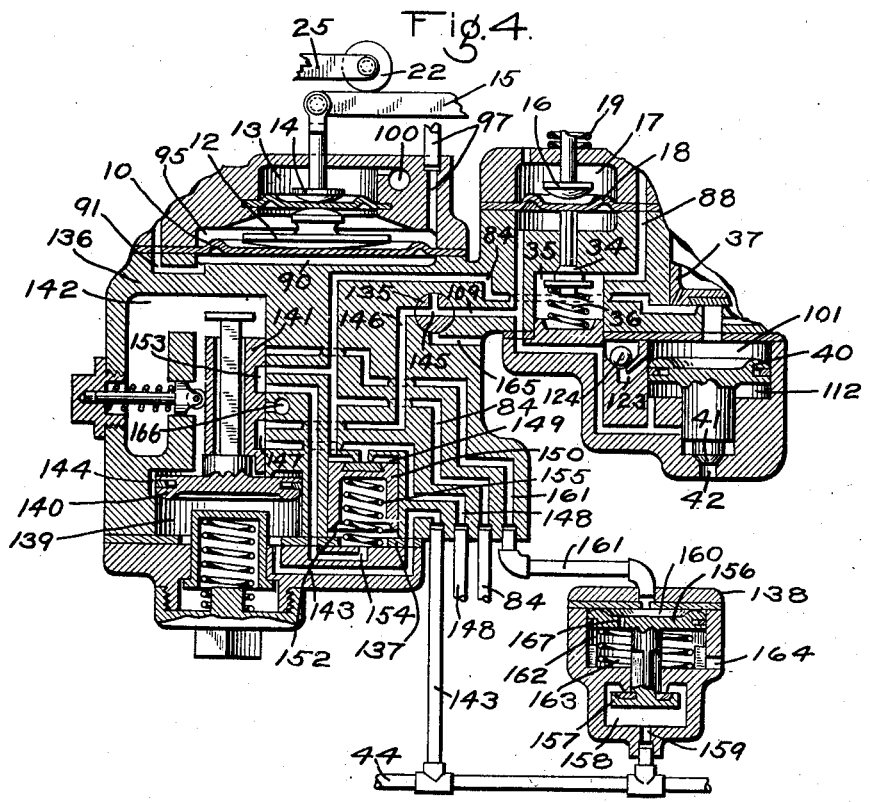

1,742,427

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

VARIABLE LOAD BRAKE

Application filed May 16, 1928. Serial No. 278,161.

This invention relates to variable load brake devices and has for an object the provision of an improved variable load device.

Another object of my invention is to provide an electro-pneumatic brake equipment in which the braking power is, under normal conditions, controlled electrically and in which under certain other conditions, is controlled pneumatically.

Another object of my invention is to provide an electro-pneumatic brake equipment in which the braking power is controlled according to the load on the car.

A further object of my invention is to provide an electro-pneumatic brake equipment in which the brake cylinder pressure is built up at a faster rate in an emergency application of the brakes than in a service application.

A still further object of my invention is to provide an electro-pneumatic brake equipment in which the brake control may be changed from electric to pneumatic without causing an emergency application of the brakes.

Other objects and advantages will appear in the following more detailed description of my invention.

In the accompanying drawings; Fig. 1 is a diagrammatic view of an electro-pneumatic brake embodying my invention; Fig. 2 is a sectional view of the same, the brake valve, brake switch and circuit wires being omitted: Fig. 3 is a sectional view of a portion of the brake equipment embodying a modification of the invention; and Fig. 4 is a similar view of the brake equipment embodying a further modification of my invention.

As shown in the drawings, the equipment may comprise a variable load mechanism 1, magnet valve device having magnets 2, 3, and 4, a brake cylinder 5, a main reservoir 6, an auxiliary reservoir 7, a triple valve device 8 and a double check valve device 9.

The variable load mechanism may comprise a casing in which there are horizontally disposed spaced flexible diaphragms 10 and 11, having interposed therebetween a follower 12 adapted to cooperate with both diaphragms. Contained in a chamber 13, at one side of the diaphragm 11, and engaging the upper surface of the diaphragm, is a follower 14, having a vertically disposed stem operatively connected with one end of a horizontally disposed lever 15 which, intermediate its ends, is operatively connected to a vertically disposed stem of a follower 16, contained in a chamber 17 at one side of a horizontally disposed flexible diaphragm 18, the follower 16 being spaced a slight distance above the upper surface of the diaphragm. Interposed between the lever 15 and the casing and surrounding the stem of the follower 16, is a spring 19. Beyond the stem of the follower 16, the end of the lever 15 is adapted to operatively engage the stem of a release valve 20.

Interposed between the body 21 of the car and the lever 15 is a movable member 22, preferably in the form of a roller, which engages the lever and forms a fulcrum therefor intermediate the stems of the followers 14 and 16. For the purpose of adjusting the position of the fulcrum member 22 along the lever 15, a bell crank lever 23 is provided which is pivotally connected with a bracket 24 mounted on the casing, one arm of the lever being operatively connected to the fulcrum member 22 through the medium of a link 25, and the other arm is adapted to be engaged by a plunger 26 of a piston device 27 which is preferably mounted on the spring plank 28 of a car truck.

Contained in a piston cylinder 29 in the casing is a piston 30 having a stem 31 extending through the casing which is adapted to operatively engage with ratchet teeth 32 formed on the link 25 to maintain the fulcrum member 22 in its proper adjusted position when the car doors (not shown) are closed. Interposed between the upper face of the piston 30 and the casing and surrounding the stem 31 is a spring 33, the use of which will hereinafter appear.

The under side of the flexible diaphragm 18 engages the stem of a pilot valve 34 contained in a valve chamber 35 in the casing, and interposed between this valve and the casing is a spring 36.

Associated with the pilot valve 34 is a supply valve piston 37 which is adapted to seal against a seat ring 38, there being a spring 39 contained in the chamber 87, at one side of the valve, which tends to maintain the valve seated on the seat ring.

Contained in a vertically disposed cylinder in the casing is a quick release piston 40 having a downwardly depending shouldered stem, the lower portion of which carries a discharge valve 41 operative to control the flow of fluid under pressure through an atmospheric passage 42.

The triple valve device 8 may comprise a casing having a piston chamber 43 connected to the brake pipe 44 and containing a piston 45, which is adapted to operate a main slide valve 46 and a graduating valve 47 contained in a valve chamber 48 which is connected to the auxiliary reservoir 7.

Associated with the variable load mechanism and triple valve device 8 is a change-over valve device which may comprise a cylinder containing connected pistons 49 and 50 adapted to operate a slide valve 51 contained in a valve chamber 52 between the pistons, which chamber is connected to the auxiliary reservoir 7 and slide valve chamber 48 of the triple valve device 8 by a passage and pipe 53. The chamber 54 in front of the piston 50 leads to the slide valve seat of the triple valve device 8 by way of a pipe and passage 55.

The check valve device 9 comprises a cylinder containing a double check valve 56 adapted to operate to control the flow of fluid under pressure through ports 57 and 58 leading to the brake cylinder through a passage and pipe 59.

The magnets 2, 3, and 4 of the magnet valve device are adapted to operate double beat valves 60 and 61, valve 62 and double beat valves 63 and 64, respectively.

In the operator's cab, an electric brake switch device 65 and a brake valve device 66 of the usual type may be provided. Normally the switch device 65 is used to control the operation of the brake, but if for any reason the brake cannot be properly controlled by this device, the brake valve device 66 may be used. When the switch device 65 is used, the brake valve device will be in running position as shown in Fig. 1 of the drawings, in which the brake pipe 44 and pipe 67 leading from a feed valve device 68 are connected.

The brake switch device 65 may comprise movable connectors 69, 70, 71, 72, and 73, and may also comprise contact terminals 74, 75, 76, and 77. The connectors 70 and 71 are electrically connected together and the connectors 72 and 73 are also electrically connected together.

Extending throughout the length of the car or train there are electric circuit wires 78, 79, 80, 81, and 82. The circuit wires 78 and 79 are connected to the positive and negative terminals respectively of a battery 83 or other suitable source of current supply. The wire 78 is also connected to the contact terminal 74 of the switch device 65. The circuit wires 80, 81, and 82 are connected to the contact terminals 75, 76, and 77 respectively of the brake switch 65 and are further connected to one terminal of the magnets 2, 3 and 4 respectively. The other terminal of each magnet is connected with the wire 79.

In operation, when the electric brake switch device is in running and release position, the connector 69 connects the contact terminals 74 and 75, and current will flow through and energize the magnet 2, causing the valve 61 to seat and the valve 60 to unseat. Now as the rotary valve of the brake valve device 66 is in running and release position as shown in Fig. 1 of the drawing, fluid under pressure supplied by the feed valve 68 will flow through pipe 67, cavity 80 in the rotary valve of the brake valve device to the brake pipe 44 and from thence through a branch pipe 81 and passage 82 in the triple valve device to the piston chamber 43, through a feed groove 83 to the slide valve chamber 48. From this chamber, fluid under pressure flows through pipe 53 to the auxiliary reservoir 7 and maintains it charged and also flows through pipe and passage 53 to the valve chamber 52 between the pistons 49 and 50 of the change-over valve device. Fluid under pressure also flows from the valve chamber 48 of the triple valve device to the chamber 54 at the front of the change-over piston 50, by way of passage and pipe 55.

When the magnet 3 is deenergized, valve 62 will be unseated, so that the piston chamber 89 of the change-over valve device, as well as the diaphragm chamber 90, will be vented to the atmosphere by way of passage and pipe 91, passage 92 in the magnet valve device, valve chamber 93 and atmospheric passage 94. It will here be noted that as the piston chamber 89 is thus vented to the atmosphere, the pressure of fluid in the piston chamber 54 acting on the face of the piston 50 and the pressure of fluid in the valve chamber 52 acting on the back of the piston 49 maintains the pistons and slide valve of the change-over valve device in its left hand position as shown in the drawings.

Further, when the magnet 4 is deenergized, the valve 63 will be unseated and the valve 64 seated, so that the diaphragm chamber 95, between the flexible diaphragms 10 and 11, and volume reservoir 96 are vented to the atmosphere by way of passage and pipe 97, chamber 98, past the open valve 63 and atmospheric passage 99. The diaphragm chamber 13 is, at all times, connected to the atmosphere through atmospheric passage 100.

With the diaphragm chambers 13, 95, and 90 thus vented, the pressure of the spring 19 acting against the lever 15 will maintain the release valve 20 unseated, so that a piston chamber 101 at one side of the piston 40 will be vented to the atmosphere by way of passage 102 and release valve chamber 103.

When the piston chamber 101 is thus vented, the diaphragm chamber 104 beneath the flexible diaphragm 18 will be vented to the atmosphere by way of a passage 105, a cavity 106 in the change-over slide valve 51, passage and pipe 108, passage 109 and atmospheric passage 42. The brake cylinder 5 is also vented to the atmosphere by way of pipe and passage 59, port 57 and chamber 110 at one side of the check valve 56, pipe and passage 108, passage 109 and atmospheric passage 42. It will be understood that as the chamber 101 is vented, the pressure of fluid in the chamber 112, at the under side of the piston 40, will cause the piston to move upwardly, thus unseating the valve 41 so that the exhaust fluid under pressure will flow to the atmosphere.

When the brake valve device 66 is in running and release position, the triple valve device 8 will be in its release position, in which the valve chamber 113 of the check valve device 9 will be vented to the atmosphere, by way of pipe and passage 114, quick action chamber 115 of the triple valve device, passage 116, cavity 117 in the slide valve 46 and atmospheric passage 118.

Fluid under pressure supplied by the feed valve 68 flows through pipe 67 and pipe and passage 84 to the chamber 85 beneath the outer seated area of the piston supply valve 37, and from thence through passage 86 in the valve 37, piston chamber 87, passage 88 to the pilot valve chamber 35. The pilot valve 34 being seated, the pressure in these chambers will be maintaned.

If it is desired to effect an electric service application of the brakes, the brake switch 65 is moved to service position, in which the magnets 2 and 3 are deenergized and the magnet 4 energized. The magnet 2 being deenergized, the valve 60 will be seated and the valve 61 unseated, the magnet 3 being deenergized, the valve 62 will be unseated, and the magnet 4 being energized, the valve 63 will be seated and the valve 64 unseated. With the valves 61, 62, and 64 unseated, fluid under pressure will flow from the auxiliary reservoir 7 through pipe 53, a chamber 119 in the magnet valve device, passage 92, pipe and passage 91, to the diaphragm chamber 90 and also to the piston chamber 89 of the change-over valve device. From the passage 91 in the magnet valve device, fluid under pressure also flows through a passage 119, a valve chamber 120, past the unseated valve 64 into chamber 98 and from thence through pipe 97 to the volume reservoir and through pipe and passage 97 to the diaphragm chamber 95. Fluid under pressure thus supplied to the diaphragm chambers 90 and 95 will equalize, and due to this, the large diaphragm 10 will not operate.

As the diaphragm chamber 13 is vented to the atmosphere through atmospheric passage 100, the pressure of fluid in the diaphragm chamber 95, acting on the small diaphragm 11, will cause this diaphragm, together with the follower 14 and one end of the bar 15 to move upwardly, the bar moving about the roller or fulcrum 22, which results in the opposite end of the bar moving downwardly against the pressure of the spring 19. When this latter end of the bar moves downwardly, the pressure of a spring 121 will cause the release valve 20 to seat. As the release valve 20 seats, the follower 16 engages the diaphragm 18 and moves it downwardly, unseating the pilot valve 34 against the pressure of the spring 36. With the valve 34 thus unseated, fluid under pressure flows from the chamber 87 at one side of the supply valve piston 37 to the brake cylinder by way of passage 88, pilot valve chamber 35, past the unseated pilot valve 34, to diaphragm chamber 104, and from thence through passage 105, cavity 106 in the slide valve 51 of the change-over valve device, pipe 108, valve chamber 110 of the check valve device, port 57 and passage and pipe 59.

As the flow of fluid under pressure from the chamber 87 is at a faster rate than fluid under pressure can be supplied through the small passage 84 in the supply valve piston 37, the pressure of fluid in this chamber will be reduced and the pressure of fluid in chamber 85 acting on the outer seated area of the piston 37 will cause said piston to move upwardly from its seat ring 38 against the pressure of the spring 39. Fluid under pressure will now flow to the brake cylinder by way of a passage 122, piston chamber 101, a passage 123, past a ball check valve 124, through passage and pipe 108, valve chamber 110 in the check valve device, port 57 and passage and pipe 59. From the passage 108, fluid under pressure also flows through passage 109 into the quick release piston chamber 112. As the pressure of fluid in the brake cylinder increases, the pressure of fluid in the piston valve chamber 87 increases and when the pressure of fluid in this chamber, together with the pressure of the spring 39 is greater than the pressure of fluid in the chamber 85 acting on the under side of the piston valve 37, said valve will seat on the seat ring 38.

In effecting a service application of the brakes, which may be less than a full service application, fluid under pressure flows to the brake cylinder so long as the brake switch is held in service position. When the desired brake cylinder pressure has been attained, the brake switch 65 is moved to lap position, in which the magnet 2 is deenergized and the magnets 3 and 4 energized. Upon the energization of the magnet 3, the valve 62 will be seated, so that further flow of fluid under pressure from the auxiliary reservoir 7 to the diaphragm chambers 13 and 90 is closed off. Now when fluid under pressure from the brake cylinder and supplied to the diaphragm chamber 104 is sufficient to move the flexible diaphragm 18, follower 16 and one end of the lever 15 upwardly against the pressure of fluid acting on the diaphragm 11, follower 14 and other end of the lever 15, the pressure of the spring 36 will cause the pilot valve 34 to seat, thus closing communication of the chamber 87 with the brake cylinder. When the pressure of fluid in the chamber 87, supplied through the small passage 86, combined with the pressure of the spring 39 contained in this chamber, becomes greater than the pressure of fluid in the chamber 85, the piston valve 37 will seat on the seat ring 38 and thus close off further supply of fluid under pressure to the brake cylinder. It will be noted that as the end of the lever 15 is moved upwardly by the action of the flexible diaphragm 18, the pilot valve 34 will seat before the lever engages the stem of the release valve 20, and as the supply of fluid to the diaphragm chamber 104 has been closed off by the seating of the pilot valve 34 and piston valve 37, the bar 15 will come to rest before it engages the stem of the release valve 20, so that said valve 20 will remain seated and the pressure of fluid in the brake cylinder will be bottled up. If leakage of fluid under pressure from the brake cylinder should occur, the pressure of fluid in the chamber 104, which is in communication with the brake cylinder, will be reduced and the follower 16 and diaphragm will move downwardly and unseat the pilot valve 34, thus reducing the pressure in the chamber 87. Fluid under pressure in the chamber 85 will cause the piston valve 37 to unseat and fluid under pressure will again flow to the brake cylinder until the pressure of fluid therein is sufficient to again move the diaphragm 18, follower 16 and one end of the lever upwardly in the manner hereinbefore described, thus maintaining the desired brake cylinder pressure against leakage.

If it is desired to release the brakes, the brake switch is moved to running and release position, in which the magnet 2 is energized and the magnets 3 and 4 deenergized. The valve 61 is therefore held seated and valve 60 unseated, the valve 62 unseated, the valve 63 unseated and the valve 64 seated. With valves 60 and 62 unseated, the diaphragm chamber 90 is vented to the atmosphere through passages and pipe 91, passage 92, valve chamber 93 and atmospheric passage 94. At the same time, with the valve 63 unseated, fluid under pressure in the diaphragm chamber 95 and volume reservoir 96 is vented to the atmosphere through pipe and passage 97, chamber 98 and atmospheric passage 99. With the diaphragm chambers 90 and 95 thus vented to the atmosphere, the pressure of the spring 19 will cause one end of the lever 15 to move upwardly, about the roller 22, into engagement with the stem of the release valve 20, causing said valve to unseat so that fluid under pressure in the quick release piston chamber 101 will be vented to the atmosphere by way of passages 122 and 102 and release valve chamber 103. Fluid under pressure in piston chamber 112 will now cause the quick release piston to move upwardly, unseating the valve 41, so that fluid under pressure from the brake cylinder will be vented to the atmosphere through pipe and passage 59, port 57, valve chamber 110 of the check valve device 9, pipe and passages 108 and 109 past the unseated valve 41 and through the atmospheric passage 42.

To effect an emergency application of the brakes electrically, the brake switch 65 is moved to emergency position. In this position, the magnets 2, 3, and 4 are deenergized, thus seating the valves 60 and 64 and unseating the valves 61, 62, and 63. When the valve 63 is unseated, the diaphragm chamber 95 will be vented to the atmosphere by way of passage and pipe 97, chamber 98 and atmospheric passage 99, and with the valves 61 and 62 unseated, fluid under pressure from the auxiliary reservoir will be supplied to the diaphragm chamber 90 by way of pipe 53, chamber 119 in the magnet valve device, valve chamber 93, passages 92 and pipe and passages 91. Fluid under pressure is also supplied to the piston chamber 89 of the change-over valve device through passage 91. Since the diaphragm chamber 95 is vented to the atmosphere, the pressure of fluid in the diaphragm chamber 90 acting on the under side of the diaphragm 10 will cause the diaphragm, together with the diaphragm followers 12 and 14 and the end of the lever 15 which is connected with the follower 14, to move upwardly about the fulcrum roller 22, causing the other end of the lever 15 to move downwardly, permitting the release valve 20 to seat, and after this valve is seated, operating the diaphragm 18 to unseat the relay valve 34. With the valve 34 unseated, fluid under pressure will be supplied to the brake cylinder in the same manner as hereinbefore described in connection with the electric service application of the brakes.

In an electric emergency application of the brakes, a higher brake cylinder pressure is obtained than is obtained in an electric service application of the brakes. It will be noted that in an emergency application, fluid at brake cylinder pressure supplied to the diaphragm chamber 104 and acting on the diaphragm 18 and lever 15, must be great enough to overcome the pressure of fluid in the diaphragm chamber 90 acting on the large diaphragm 10, followers 12 and 14 and lever 15, before the pilot valve 34 and piston valve 37 are seated to cut off the supply of fluid under pressure to the brake cylinder, while in a service application, the pressure of fluid in the chamber 104 must only be great enough to overcome the pressure of fluid in the diaphragm chamber 95 acting on the smaller diaphragm 11. Thus, in an emergency application of the brakes, the pressure of fluid in the brake cylinder will be higher than in a service application.

In effecting an emergency application of the brakes, the flexible diaphragm chamber 95 is vented to the atmosphere and fluid under pressure is supplied to the diaphragm chamber 90, and this pressure acting on the large diaphragm 10 will, through the medium of the followers 12 and 14, lever 15, follower 16 and flexible diaphragm 18, cause the pilot valve to be unseated, which in turn causes the supply valve to be unseated and supply fluid under pressure to the brake cylinder. As the flow of fluid under pressure to the diaphragm chamber 90 is unrestrained, the rate at which the pressure is built up in this chamber is faster than the build up of brake cylinder pressure in the diaphragm chamber 104, so that the pilot valve 34 and supply valve 37 will remain unseated until the application of the brakes is effected.

In effecting a service application of the brakes, the flow of fluid under pressure to the brake cylinder is not continuous, as is the case in an emergency application, but is checked or closed off at intervals during the service application, and this checking or closing off of the supply of fluid under pressure is due to the volume reservoir being connected to the diaphragm chamber 95. With the volume reservoir 96 and diaphragm chamber 95 thus connected, the rate at which pressure in the chamber 95 is built up will be retarded, so that when the pilot valve 34 and supply valve 37 are unseated, brake cylinder pressure in the diaphragm chamber 104 will build up at a faster rate than the pressure can be built up in the diaphragm chamber 95, with the result that the diaphragm 18 will move upwardly against the pressure of fluid in the chamber 95 acting on the diaphragm 11, which permits the pilot valve 34 to seat, causing the supply valve 37 to seat and cut off the further supply of fluid under pressure to the brake cylinder. Now when the pressure is again built up sufficiently in the chamber 95 to overcome the pressure of fluid in the diaphragm chamber 104, the diaphragm 18 will be moved downwardly, unseating the pilot valve 34, which in turn causes the supply valve to unseat and again supply fluid under pressure to the brake cylinder, and these operations will continue until the desired service application of the brakes is effected.

It will be noted from the three preceding paragraphs that in an emergency application of the brakes, the brake cylinder pressure will be built up at a faster rate than in a service application.

In operating the brake electrically, the brake cylinder pressure will be automatically varied according to the load on the car. This variation in brake cylinder pressure is effected by the changing of the position of the fulcrum roller 22 along the lever 15. In the present embodiment of my invention, this adjustment is accomplished through the operation of the usual door engine (not shown). In opening the doors, one of the piston chambers of the door engine is vented to the atmosphere and as this chamber is vented, the piston chamber 125 at one side of the piston 30 will also be vented by way of pipe and passage 126, so that the pressure of the spring 33 will move the piston 30 downwardly, causing the pawl 31 to be moved out of engagement with the ratchet teeth 32 of the lever 15. Fluid under pressure supplied to the other piston chamber of the door engine also flows to the piston device 27 through pipe 128, causing the plunger 26 to be moved upwardly, and if the load on the car is such that the brake cylinder pressure should be increased, the plunger will engage the lever 23 and rotate it about its fulcrum a sufficient distance to cause the roller 22 to be moved to its proper adjusted position. Now when the door engine is operated to close the doors, fluid under pressure will be supplied to the chamber 125, causing the piston 30 to move upwardly so that the pawl 31 will engage one of the teeth 32 on the lever 15, thus holding the lever and fulcrum roller 22 in their adjusted positions until the doors are again opened.

Should the electric current supply fail at any time, the magnets 2, 3, and 4 will be de-energized and an emergency application will be effected in the same manner as when the brake switch is moved to emergency position. To release the brakes after such an emergency application, the brake valve device 66 is first moved from running and release position to service position, in which a brake pipe reduction is effected, which operates to cause movement of the triple valve device 8 to service position. In this position, the cavity 117 in the main slide valve 46 will connect the passage 55 to the atmospheric passage 118, thus venting fluid under pressure from the piston chamber 54 of the change-over valve device. When this chamber is thus vented, the pressure of fluid in the valve chamber 52 of the change-over valve device, acting on the back of the large piston 50, causes the connected pistons and slide valve 51 to move to their right hand positions. With the change-over valve device in this position, the cavity 106 in the slide valve 51 will connect the pipe and passage 108 to an atmospheric passage 129, thus venting the valve chamber 110 of the check valve device 9.

When the main slide valve 46 of the triple valve device 8 is moved to service position, the passage 114 leading to the slide valve seat will be uncovered so that fluid under pressure will flow from the valve chamber 48 through this passage and pipe 114 to the valve chamber 113 of the check valve device 9.

Since the chamber 110 is vented, the pressure of fluid flowing into chamber 113 will cause the check valve to move to its left hand position, in which fluid under pressure will be supplied to the brake cylinder by way of port 58 and passage and pipe 59.

The brake valve device is now moved to its running and release position, in which position the main slide valve 46 of the triple valve device 8 will close off the supply of fluid under pressure from the valve chamber 48 to the brake cylinder. In this position, the cavity 117 in the slide valve 46 will connect the passage 116 to the atmospheric passage 118, so that fluid under pressure from the brake cylinder will be vented to the atmosphere by way of pipe and passage 59, port 58 in the check valve device 9, valve chamber 113, pipe 114, quick action chamber 115, passage 116, cavity 117 in the slide valve of the triple valve device and atmospheric passage 118.

Further, the main slide valve 46, as it is moved to its running and release position, uncovers the passage 55 so that fluid under pressure will again flow therethrough and through pipe 55 to the piston chamber 54, but as there is fluid under pressure in the piston chamber 89 and valve chamber 52 supplied from the auxiliary reservoir, the change-over valve device will be balanced and will remain in its right hand position.

By operating the brake valve device 66, the brakes may be controlled pneumatically in the usual well known manner.

When the current supply is again provided and it is desired to change over from pneumatic to electric control, the brake switch 65 and brake valve device are both moved to running and release position, in which the piston chamber 89 will be vented to the atmosphere as hereinbefore described and fluid under pressure will be supplied to the piston chamber 54.

Since there is fluid under pressure supplied to the valve chamber 52 from the auxiliary reservoir at all times, the pressure of fluid in this chamber, acting on the back of the small piston, will cause the pistons and slide valve to move to their right hand positions, in which the valve chamber 110 of the check valve device will be again connected to the diaphragm chamber 104.

When the brake switch 65 is moved to effect an application of the brakes, fluid is supplied through the pipe 108 to the chamber 110 of the check valve device, and as the valve chamber 113 is vented to the atmosphere, the pressure of fluid in the chamber 110 will cause the valve 56 to move to its right hand position to supply fluid under pressure to the brake cylinder.

In changing locomotives or cars, the circuit wires will be disconnected and the magnets 2, 3, and 4 deenergized, which would effect an emergency application of the brakes in the manner hereinbefore described, and in order to prevent such an application of the brakes, brake switch 65 is maintained in running and release position and the brake valve device 66 is moved to service position, in which a brake pipe reduction is effected, causing the triple valve device to move to service position. With the triple valve device in this position, the piston chamber 54 of the change-over valve device is vented to the atmosphere, so that the pressure of fluid in the valve chamber 52 acting on the back of the large piston 50 will cause the connected pistons and slide valve 51 to move to their right hand positions. With the slide valve 51 in this position, the cavity 106 will connect the passage and pipe 108 to the atmospheric passage 129, thus venting the valve chamber 110 of the check valve device 9.

With the chamber 110 vented to the atmosphere, the pressure of fluid supplied to the valve chamber 113 by the triple valve device causes the check valve 56 to move to its left hand position, closing off communication of the brake cylinder to the valve chamber 110 and establishing communication through which fluid under pressure from the valve chamber 113 will flow to the brake cylinder.

When the circuit wires are disconnected and the magnets 2, 3, and 4 are deenergized, the pilot valve 34 will be unseated in the manner hereinbefore described, but as the passage 105 is lapped by slide valve 51 of the change-over valve device, there will be no flow of fluid under pressure from the piston valve chamber 87, so that the supply valve 37 will remain seated, preventing the flow of fluid under pressure to the brake cylinder. It will thus be noted that the apparatus may be changed over from electric to pneumatic control without effecting an emergency application of the brakes.

In Fig. 3, a modified form of the invention has been illustrated in which a manually operable change-over valve device 129 has been substituted for the automatically operable change-over valve device with which the apparatus shown in Figs. 1 and 2 is equipped. This change-over valve device 129 comprises a casing in which there is mounted a rotatable valve 130 operative by a handle 131, and having a passage 132 extending therethrough adapted to normally establish communication through which fluid under pressure is supplied through the check valve device 9 to the brake cylinder in an electric application of the brakes.

When it is desided to release an electric emergency application of the brakes by the use of this change-over valve device, the valve is turned to such a position that fluid under pressure from the brake cylinder will be vented to the atmosphere by way of pipe and passage 59, port 57 in the check valve device, valve chamber 110, pipe 133, passage 132 in the valve 130 and atmospheric passage 134 in the valve casing.

The brake may now be pneumatically controlled in the usual manner by the brake valve 66. When a reduction in brake pipe pressure is effected to apply the brakes, the triple valve device will operate to supply fluid under pressure to the valve chamber 113 of the check valve device, and as the chamber 110 of this check valve device is vented to the atmosphere, the pressure of fluid will cause the check valve 56 to move to its left hand position, thus closing off communication between the brake cylinder and atmosphere and establishing communication through which fluid under pressure is supplied to the brake cylinder.

In Fig. 4, a further modification of the invention is illustrated which differs from the apparatus shown in Figs. 1 and 2, in that the triple valve device is omitted, a manually operative change-over valve device 135 is substituted for the automatically operative change-over valve device, and in addition there is provided an emergency valve device 136, an emergency supply valve device 137 and a brake pipe vent valve device 138. The emergency valve device 136, supply valve device 137 and vent valve device 138 are only operative to effect a pneumatic emergency application of the brakes.

The emergency valve device 136 may comprise a casing having a chamber 139 containing an emergency piston 140, adapted to operate a slide valve 141 contained in a chamber 142. The piston chamber 139 is connected to the brake pipe 44 through passage and pipe 143, and fluid under pressure thus supplied to this chamber will flow through a feed groove 144 and charge the valve chamber 142.

In an electric service or an electric emergency application of the brakes, the emergency valve device will not operate and fluid under pressure will be supplied to the brake cylinder through passage 109, a passage 145 in the change-over valve 135, a passage 146, a cavity 147 in the slide valve 141 and pipe and passage 148.

The pipe and passage 84, leading from the feed valve pipe 67, through which fluid under pressure is supplied to the supply valve chamber 85, also supplies fluid under pressure to a chamber 149 at one side of an emergency supply valve piston 150 which is adapted to seal against a seat ring 151. The chamber 152 at the other side of the piston 150 is supplied with fluid under pressure from the passage 84 through a cavity 153 and passage 154, so that the pressure of a spring 155 contained in the chamber 152 will maintain the piston valve 150 seated, thus closing off communication of this chamber with the brake cylinder passage 148

The brake pipe vent valve device comprises a cylinder containing a piston 156 adapted to operate a valve 157 contained in a chamber 158 which is connected with the brake pipe 44 through a passage 159. The chamber 160 at one side of the piston leads to the slide valve seat through a pipe and passage 161. The chamber 162 at the other side of the piston contains a spring 163 and is open to the atmosphere through a passage 164.

The valve 157, when the piston is in its normal upper position as shown in Fig. 4, is maintained seated on its seat ring by the pressure of the spring 163.

Should an electric emergency application of the brakes be effected, due to the failure of the electric current supply, and it should be desired to release such an application, the valve 135 is rotated to such a position that it will close off further supply of fluid to the brake cylinder and the passage 145 will connect the passage 146 to an atmospheric passage 165, thus releasing the pressure of fluid in the brake cylinder.

Now if it is desired to control the brakes pneumatically, the brake valve device 66 is operated to effect a reduction in brake pipe pressure in the usual manner, which operates to reduce the pressure of fluid in the piston chamber 139 of the emergency valve device, so that the pressure of fluid in the valve chamber 142 will cause the piston 140 and slide valve 141 to move to their emergency positions.

With the slide valve in emergency position, fluid under pressure in the chamber 152 will be vented to the atmosphere by way of passage 154, cavity 153 in the slide valve 141 and atmospheric passage 166. The pressure of fluid in the chamber 149 acting on the outer seated area of the piston valve 150 causes said valve to move downwardly against the pressure of the spring 155 and fluid under pressure will flow through pipe and passage 148 to the brake cylinder.

Further, in the emergency position of the slide valve, the passage 146 will be lapped, so that fluid under pressure supplied to the passage 148 cannot flow to the atmosphere by way of passage 146, passage 145 of the change-over valve device and atmospheric passage 165.

When the slide valve 141 moves to its emergency position, the passage 161 will be uncovered and fluid under pressure will flow therethrough to the chamber 160 of the vent valve device and will cause the piston 156 and valve 157 connected therewith to move downwardly, thus opening communication through which fluid under pressure from the brake pipe will be suddenly vented to the atmosphere by way of chamber 162 and atmospheric passage 164, which ensures this emergency action to be propagated in the usual well known manner.

The piston 156 of the vent valve is provided with a restricted passage 167 through which fluid under pressure from the valve chamber 142 flowing through passage and pipe 161 and piston chamber 160 is vented to the atmosphere by way of chamber 162 and atmospheric passage 164.

When the pressure of fluid supplied to the chamber 160 is less than the pressure of the spring 163, the spring will cause the piston 156 to move to its upper position, thus seating the piston valve 157 to close off further flow of fluid under pressure from the brake pipe to atmosphere.

To release the brakes after such an application, brake pipe pressure is built up, causing the emergency piston to move to its release position as shown in Fig. 4, in which position fluid under pressure from the brake cylinder will be vented to the atmosphere by way of pipe and passage 148, cavity 147 in the slide valve 141, passage 146, passage 145 in the change-over valve and atmospheric passage 165. In this position of the slide valve, fluid under pressure will again be supplied to the chamber 152, so that the pressure of the spring 155 will cause the piston valve 150 to seat on its seat ring.

While several illustrative embodiments of the invention have been described in detail, it is not my intention to limit its scope to these embodiments or otherwise than by the terms of the appended claims.

Having now described my invention, what I claim as new and desire to secure by Letters Patent, is:—

1. In a braking apparatus, the combination with a brake cylinder, of electrically controlled means for supplying fluid under pressure to the brake cylinder, and means included in said electrically controlled means for varying the pressure of fluid supplied to said brake cylinder according to the load on the car.

2. In a braking apparatus, the combination with a brake cylinder, of electrically controlled means for supplying and releasing fluid under pressure to and from the brake cylinder according to the load on the car.

3. In a braking apparatus, the combination with a brake cylinder, of electrically controlled means for supplying fluid under pressure to the brake cylinder, and means adjustable according to the load on the car and cooperating with said electrically controlled means for varying the pressure of fluid supplied to said brake cylinder.

4. In a braking apparatus, the combination with a brake cylinder, of electrically controlled means for supplying fluid under pressure to the brake cylinder, said means including valve means for controlling the supply of fluid under pressure to the brake cylinder, a lever for operating said valve means, means for operating said lever, a fulcrum for said lever, and means operative according to the load on the car for adjusting the position of said fulcrum.

5. In a braking apparatus, the combination with a brake cylinder, of electrically controlled means for supplying fluid under pressure to the brake cylinder, said means including valve means for controlling the supply of fluid under pressure to the brake cylinder, a lever for operating said valve means, means subject to fluid under pressure for operating said lever, a fulcrum for said lever, and means operative according to the load on the car for adjusting the position of said fulcrum.

6. In a braking apparatus, the combination with a brake cylinder, of valve means for controlling the supply of fluid under pressure to the brake cylinder, a lever for effecting the operation of said valve means, means operative by fluid under pressure for operating said lever, electrically controlled means for supplying fluid under pressure to said means, and a fulcrum for said lever adjustable automatically for effecting the control of the brakes according to the load on the car.

7. In a braking apparatus, the combination with a brake cylinder, of valve means for controlling the supply of fluid under pressure to the brake cylinder, a lever for effecting the operation of said valve means, means operative by fluid under pressure for operating said lever, electrically controlled means for supplying fluid under pressure to said means, and a fulcrum for said lever adapted to be adjusted to vary the pressure of fluid supplied to said brake cylinder according to the load on the car.

8. In a braking apparatus, the combination with electrically controlled means for controlling the brakes according to the load on the car, of pneumatically controlled means for controlling the brakes, and means operative to render either the electrically controlled means or the pneumatically controlled means effective to control the brakes.

9. In a braking apparatus, the combination with electrically controlled means for controlling the brakes and pneumatically controlled means for controlling the brakes, of means operative when the brakes are controlled electrically for effecting an application of the brakes according to the load on the car.

10. In a braking apparatus, the combination with electrically controlled means for controlling the brakes and pneumatically controlled means for controlling the brakes, of means operative when the brakes are controlled electrically for controlling the operation of the brakes according to the load on the car.

11. In a braking apparatus, the combination with a brake cylinder, of electrically controlled means for controlling the supply of fluid under pressure to the brake cylinder according to the load on the car, pneumatically controlled means for controlling the supply of fluid under pressure to the brake cylinder, and means controlled pneumatically for controlling communication through which fluid under pressure is supplied to the brake cylinder.

12. In a braking apparatus, the combination with a brake cylinder, of electrically controlled means for supplying fluid under pressure to the brake cylinder, pneumatically controlled means for supplying fluid under pressure to the brake cylinder, a valve subject at one time to the pressure of fluid supplied by said electrically controlled means for establishing communication through which fluid under pressure is supplied to said brake cylinder and subject at another time to the pressure of fluid supplied by said pneumatically controlled means for establishing communication through which fluid under pressure is supplied to said brake cylinder.

13. In a braking apparatus, the combination with a brake cylinder, of electrically controlled means for supplying fluid under pressure to the brake cylinder, pneumatically controlled means for supplying fluid under pressure to the brake cylinder, a triple valve device included in said pneumatically controlled means, a valve establishing communication through which fluid under pressure is supplied to said brake cylinder by said electrically controlled means, and means operative upon the operation of said triple valve device for releasing the pressure of fluid from one side of said valve and for supplying fluid under pressure to the other side of said valve to cause said valve to operate to close off said communication and establish communication through which fluid under pressure is supplied to said brake cylinder by said pneumatically controlled means.

14. In a braking apparatus, the combination with a brake cylinder, of electrically controlled means for supplying fluid under pressure to the brake cylinder, pneumatically controlled means for supplying fluid under pressure to the brake cylinder, a valve establishing communication through which fluid under pressure is supplied to said brake cylinder by the deenergization of said electrically controlled means, and means operative upon the operation of said pneumatically controlled means for releasing the pressure of fluid on one side of said valve and for supplying fluid under pressure to the other side of said valve to cause the valve to operate to close off said communication and to establish communication through which fluid under pressure is supplied to said brake cylinder by said pneumatically controlled means.

15. In a braking apparatus, the combination with a brake cylinder, of valve means for controlling the supply of fluid under pressure to said brake cylinder, mechanism for operating said valve means, said mechanism being adjustable according to the load on the car and subject to the opposing pressures of the brake cylinder and a chamber for controlling the pressure in said brake cylinder, and electrically controlled means for supplying fluid under pressure to said chamber.

16. In a braking apparatus, the combination with a brake cylinder, of valve means for controlling the supply of fluid under pressure to said brake cylinder, mechanism adjustable according to the load on the car for operating said valve means, said mechanism being subject to the opposing pressures of the brake cylinder and a chamber in effecting a service application of the brakes and subject to the opposing pressures of the brake cylinder and another chamber in effecting an emergency application of the brakes.

17. In a braking apparatus, the combination with a brake cylinder, of valve means for controlling the supply of fluid under pressure to said brake cylinder, mechanism adjustable according to the load on the car for operating said valve means, said mechanism being subject to the opposing pressures of the brake cylinder and a chamber in effecting a service application of the brakes and subject to the opposing pressures of the brake cylinder and another chamber in effecting an emergency application of the brakes, and electrically controlled means for supplying fluid under pressure to said chambers.

18. In a braking apparatus, the combination with a brake cylinder, of valve means for controlling the supply of fluid under pressure to said brake cylinder, mechanism adjustable according to the load on the car for operating said valve means, said mechanism being subject to the opposing pressures of the brake cylinder and a chamber in effecting a service application of the brakes and subject to the opposing pressures of the brake cylinder and another chamber in effecting an emergency application of the brakes, and means for at one time supplying fluid under pressure to both of said chambers and at another time to the last mentioned chamber.

19. In a braking apparatus, the combination with a brake cylinder, of valve means for controlling the supply of fluid under pressure to said brake cylinder, mechanism adjustable according to the load on the car for operating said valve means, said mechanism being subject to the opposing pressures of the brake cylinder and a chamber in effecting a service application of the brakes and subject to the opposing pressures of the brake cylinder and another chamber in effecting an emergency application of the brakes, and means operative to supply fluid under pressure to both of said chambers to effect a service application of the brakes and operative to supply fluid under pressure to one of said chambers to effect an emergency application of the brakes.

20. In a braking apparatus, the combination with a brake cylinder, of valve means for controlling the supply of fluid under pressure to said brake cylinder, mechanism adjustable according to the load on the car for operating said valve means, said mechanism being subject to the opposing pressures of the brake cylinder and a chamber in effecting a service application of the brakes and subject to the opposing pressures of the brake cylinder and another chamber in effecting an emergency application of the brakes, and means operative to supply fluid under pressure to both of said chambers at a slow rate to effect a service application of the brakes and operative to supply fluid under pressure to one of said chambers at a fast rate to effect an emergency application of the brakes.

21. In a braking apparatus, the combination with a brake cylinder, of valve means for controlling the supply of fluid under pressure to said brake cylinder, mechanism adjustable according to the load on the car for operating said valve means, said mechanism being subject to the opposing pressures of the brake cylinder and a chamber in effecting a service application of the brakes and subject to the opposing pressures of the brake cylinder and another chamber in effecting an emergency application of the brakes, means operative to supply fluid under pressure to both of said chambers to effect a service application of the brakes and operative to supply fluid under pressure to one of said chambers to effect an emergency application of the brakes, and means for retarding the rate of build up in pressure in both of said chambers in effecting a service application.

22. In a braking apparatus, the combination with means for controlling the brakes electrically and means for controlling the brakes pneumatically, of means operative to render either the electric brake controlling means or the pneumatic brake controlling means effective to control the brakes, and a triple valve device included in the pneumatic brake controlling means operative to control the operation of the means for rendering either of the brake controlling means effective.

23. In a braking apparatus, the combination with means for controlling the brakes electrically and means for controlling the brakes pneumatically, of means operative to render either the electric brake controlling means or the pneumatic brake controlling means effective to control the brakes, a brake pipe, and a triple valve device subject to brake pipe pressure for controlling the operation of the means for rendering either of the brake controlling means effective.

24. In a braking apparatus, the combination with means for controlling the brakes electrically and means for controlling the brakes pneumatically, of means having one position in which the electric brake controlling means is rendered effective to control the brakes and another position in which the pneumatic controlling means is rendered effective to control the brakes, and a valve device operative to control the movement of said means to its different positions.

25. In a braking apparatus, the combination with means for controlling the brakes electrically and means for controlling the brakes pneumatically, of means having one position in which the electric brake controlling means is rendered effective to control the brakes and another position in which the pneumatic controlling means is rendered effective to control the brakes, and a change-over slide valve device operative to control the movement of said means to its different positions.

26. In a braking apparatus, the combination with means for controlling the brakes electrically and means for controlling the brakes pneumatically, a check valve having one position in which the electric brake controlling means is rendered effective to control the brakes and another position in which the pneumatic means is rendered effective to control the brakes, and a valve device operative to control the movements of said check valve.

27. In a braking apparatus, the combination with a brake cylinder, of electrically controlled means operative upon deenergization for supplying fluid under pressure to the brake cylinder, pneumatically controlled means for supplying fluid under pressure to the brake cylinder and means for preventing the electrically controlled means from operating to supply fluid under pressure to the brake cylinder upon the deenergization of said electrically controlled means when the pneumatically controlled means are operated.

28. In a braking apparatus, the combination with electrically controlled means operative upon deenergization for effecting an emergency application of the brakes, of pneumatically controlled means for effecting a service application of the brakes, and means controlled by the operation of said pneumatically controlled means for preventing an emergency application of the brakes electrically when said pneumatically controlled means are in service position.

In testimony whereof I have hereunto set my hand.

THOMAS H. THOMAS.